(12) United States Patent
Kennedy

(10) Patent No.: US 10,162,504 B2
(45) Date of Patent: Dec. 25, 2018

(54) ZOOMED VIEWING OF TERMINAL CHARTS

(71) Applicant: The Boeing Company, Chicago, IL (US)

(72) Inventor: Brian B. Kennedy, Portland, OR (US)

(73) Assignee: The Boeing Company, Chicago, IL (US)

( * ) Notice: Subject to any disclaimer, the term of this patent is extended or adjusted under 35 U.S.C. 154(b) by 38 days.

(21) Appl. No.: 15/362,815

(22) Filed: Nov. 28, 2016

(65) Prior Publication Data

US 2017/0123639 A1 May 4, 2017

Related U.S. Application Data

(62) Division of application No. 12/394,568, filed on Feb. 27, 2009, now Pat. No. 9,508,270.

(51) Int. Cl.

| | |
|---|---|
| *G06F 3/0484* | (2013.01) |
| *G06T 3/40* | (2006.01) |
| *G09B 29/00* | (2006.01) |
| *G08G 5/00* | (2006.01) |
| *G01C 23/00* | (2006.01) |

(Continued)

(52) U.S. Cl.
CPC ......... *G06F 3/04845* (2013.01); *G01C 23/00* (2013.01); *G06F 3/04842* (2013.01); *G06T 3/40* (2013.01); *G08G 5/0026* (2013.01); *G09B 29/007* (2013.01); *G09B 29/10* (2013.01); *G06F 2203/04806* (2013.01); *G06T 11/206* (2013.01); *G06T 2200/24* (2013.01)

(58) Field of Classification Search
CPC ........ G09B 29/007; G09B 29/10; G06T 3/40; G06F 2203/04806; G01C 23/00; G08G 5/0026
See application file for complete search history.

(56) References Cited

U.S. PATENT DOCUMENTS

| | | |
|---|---|---|
| 8,933,957 B2 | 1/2015 | Kennedy |
| 9,508,270 B2 | 11/2016 | Kennedy |
| 2006/0265664 A1 | 11/2006 | Simons et al. |

(Continued)

FOREIGN PATENT DOCUMENTS

| | | |
|---|---|---|
| JP | 2004341693 A1 | 12/2004 |
| JP | 2006005773 A1 | 1/2005 |

OTHER PUBLICATIONS

Intellectual Property Office Search and Examination Report, dated Jan. 7, 2011, regarding Application No. GB1002458.6, 6 pages.

(Continued)

*Primary Examiner* — Jeffery A Brier
(74) *Attorney, Agent, or Firm* — Yee & Associates, P.C.

(57) ABSTRACT

The different advantageous embodiments provide a computer implemented method, apparatus, and computer program product for generating a display of magnified information. A selection is received of an area of a chart on a display device to form a selected area through a user input device. Coordinates are identified for the selected area. A category assigned to the selected area is identified using the coordinates identified. Related areas of the chart are identified using the category identified. The selected area and the related areas are compiled to form display information and the display information is displayed on the display device having a selected size.

20 Claims, 12 Drawing Sheets

(51) Int. Cl.
*G09B 29/10* (2006.01)
*G06T 11/20* (2006.01)

(56) References Cited

U.S. PATENT DOCUMENTS

| | | |
|---|---|---|
| 2007/0061760 A1 | 3/2007 | Ikegami |
| 2007/0099642 A1 | 5/2007 | Jin |
| 2007/0168120 A1 | 7/2007 | Vandenbergh et al. |
| 2008/0125960 A1 | 5/2008 | Wipplinger et al. |
| 2008/0125962 A1 | 5/2008 | Wipplinger et al. |
| 2008/0276198 A1 | 11/2008 | Fertl |
| 2010/0039438 A1 | 2/2010 | Kennedy |
| 2010/0220113 A1 | 9/2010 | Kennedy |

OTHER PUBLICATIONS

Araki et al., "Zooming Cross-Media: A Zooming Description Language Coding LOD Control and Media Transition," International Conference on Database and Expert Systems Applications (DEXA 2005), Lecture Notes in Computer Science, vol. 3588, Aug. 2005, pp. 260-269.

Carmo et al., "Filtering Mechanisms for the Visualization of Georeferenced Information," Proceedings of the 2005 Workshop on Geographic Information Retrieval (GIR '05), Nov. 2005, pp. 1-4.

Carmo et al., "Visualization of Geographic Query Results for Small Screen Devices," Proceedings of the 2007 Workshop on Geographic Information Retrieval (GIR '07), Nov. 2007, pp. 63-64.

Cockburn et al., "A Review of Overview+Detail, Zooming, and Focus+Context Interfaces," ACM Computing Surveys, vol. 41, No. 1, Jan. 2009, 42 pages.

Office Action, dated Jun. 28, 2012, regarding U.S. Appl. No. 12/394,568, 22 pages.

Final Office Action, dated Oct. 12, 2012, regarding U.S. Appl. No. 12/394,568, 13 pages.

Office Action, dated Jan. 22, 2016, regarding U.S. Appl. No. 12/394,568, 21 pages.

Final Office Action, dated Apr. 14, 2016, regarding U.S. Appl. No. 12/394,568, 13 pages.

Notice of Allowance, dated Jul. 21, 2016, regarding U.S. Appl. No. 12/394,568, 5 pages.

ZOOMED VIEWING OF TERMINAL CHARTS

This application is a divisional application of U.S. patent application Ser. No. 12/394,568, filed Feb. 27, 2009, which issued as U.S. Pat. No. 9,508,270.

BACKGROUND INFORMATION

1. Field

The present disclosure relates generally to information retrieval and in particular to improved visual information enhancement. Still more particularly, the present disclosure relates to a method and apparatus for viewing navigation charts.

2. Background

Pilots use aeronautical charts in planning flights and during actual flights. An aeronautical chart is a type of navigation chart or map designed to assist in the navigation of aircraft on the ground or in the air. With these charts and other tools, pilots are able to identify information, such as, for example, their position, safe altitude, best route to a destination, navigation aids or waypoints, alternative landing sites in case of emergency, and other useful information. Other information that may be provided by aeronautical charts includes radio frequencies and airspace boundaries.

These navigation charts may be in the electronic form and presented through electronic map applications. In addition to displaying navigation charts, these electronic maps also may provide a moving map function. A moving map function displays the location of an aircraft relative to the underlying geo-referenced aeronautical information. Further, the moving map function also may provide a direction of travel for the aircraft.

Terminal charts are charts containing a map or diagram and related textual aviation information used by pilots. Terminal charts are composed of boxes of related information, and contain a large amount of densely displayed information.

A terminal chart, when viewed in its entirety, displays too much information to be easily viewed and comprehended. It is typically necessary to zoom in on the area of the chart that the pilot is interested in.

Therefore it would be advantageous to have a method and apparatus that takes into account one of more of the issues discussed above as well as possibly other issues.

SUMMARY

An embodiment of the present disclosure provides a computer implemented method, apparatus, and computer program product for generating a display of magnified information. A selection is received of an area of a chart on a display device to form a selected area through a user input device. Coordinates are identified for the selected area. A category assigned to the selected area is identified using the coordinates identified. Related areas of the chart are identified using the category identified. The selected area and the related areas are compiled to form display information and the display information is displayed on the display device having a selected size.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
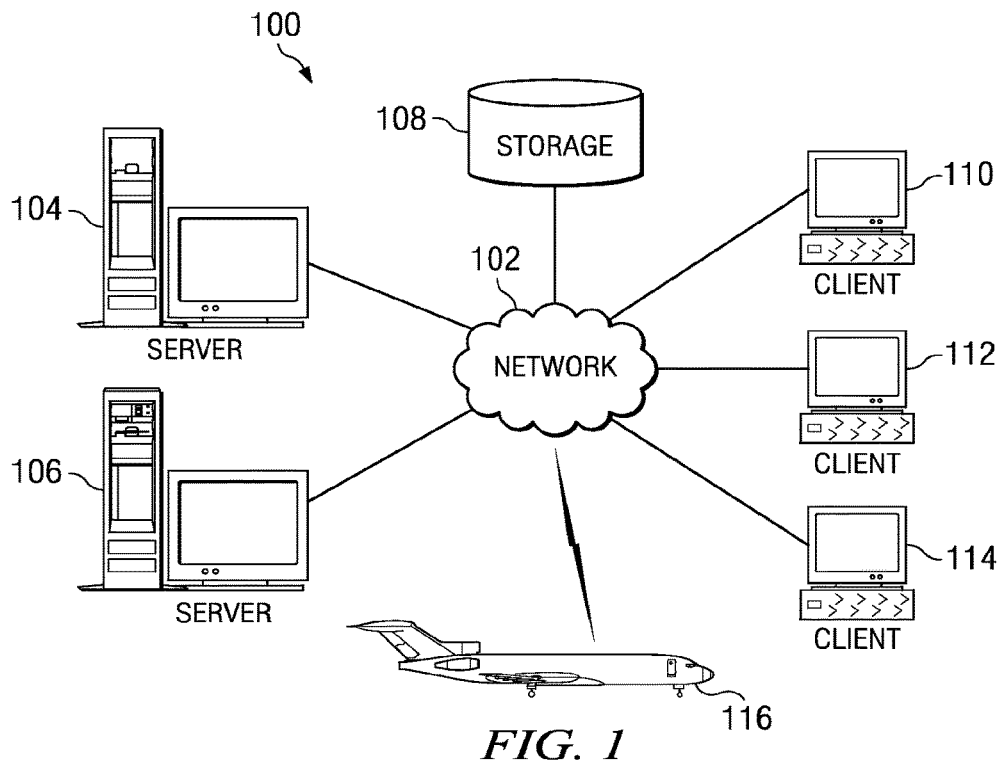
FIG. 1 is a pictorial representation of a network of data processing systems in which the advantageous embodiments may be implemented.
Figure 2:
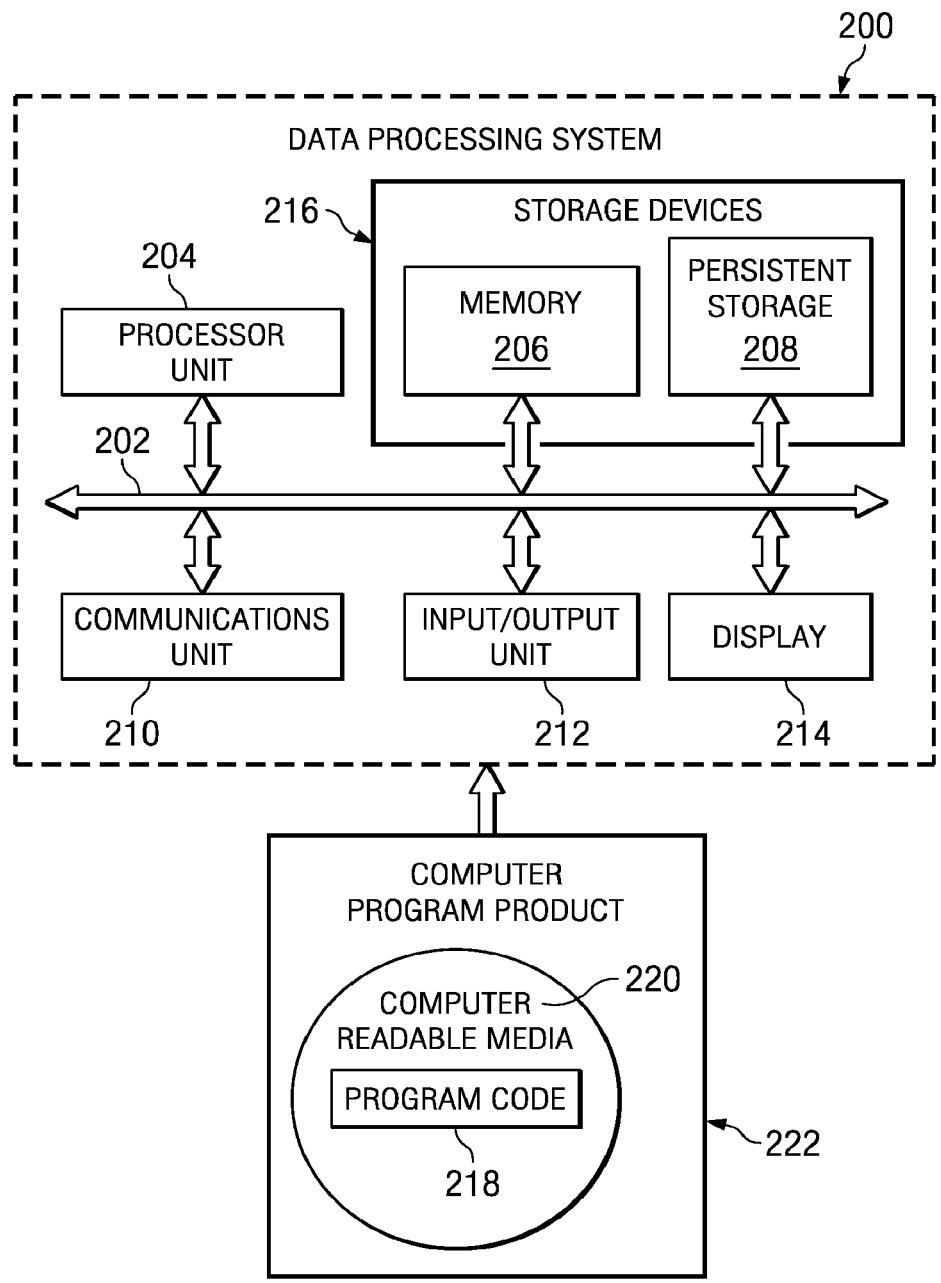
FIG. 2 is a diagram of a data processing system in accordance with an advantageous embodiment.

With reference now to the figures and in particular with reference to FIGS. 1-2, diagrams of data processing environments are provided in which the advantageous embodiments of the present invention may be implemented. It should be appreciated that FIGS. 1-2 are only illustrative examples and are not intended to assert or imply any limitation with regard to the environments in which different embodiments may be implemented. Many modifications to the depicted environments may be made.

FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114.

Aircraft 116 also may exchange information with servers 104 and 106. Aircraft 116 may exchange data with different computers through a wireless communications link while in-flight or any other type of communications link while on the ground. In these examples, server 104, server 106, client 110, client 112, and client 114 may be computers. Network data processing system 100 may include additional servers, clients, and other devices not shown.

Network data processing system 100 provides an environment in which information may be provided in electronic map applications and in particular, relevant portions of terminal charts may be identified and enlarged for display within network data processing system 100. For example, an electronic map application executing on aircraft 116 may identify and enlarge selected portions of a terminal chart selected by a pilot.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is depicted in accordance with an illustrative embodiment. Data processing system 200 is an example of a computer, such as a computer located on aircraft 116 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer recordable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

The different advantageous embodiments recognize that terminal charts contain information in a dense form. This information may include, for example, maps, diagrams, textual information, and/or other information. The presentation of this information often has a density that is too much to be easily viewed and comprehended. With currently used terminal charts, it is typically necessary to zoom in or pan across areas of the chart in order to view information of interest.

The different advantageous embodiments also recognize that current methods for zooming in on information, or enlarging areas of a chart, require switching between zoom in and zoom out modes. This process uses multiple selections or clicks by a user, and may require multiple selections of the zoom in feature in order to enlarge the area of interest. Other currently available methods have dedicated but separate zoom in or zoom out buttons that enlarge an entire chart. These types of methods also require a user to pan across the enlarged chart to find the area of interest.

Still other currently available methods require using a mouse to drag a zoom box around the area of interest. This process returns an enlarged area that may include more information than desired due to the aspect ratio of the viewing area and the zoom box, and presents multiple steps in order to zoom out and return to the entire chart view.

Thus, the different advantageous embodiments provide a computer implemented method, apparatus, and computer program code for generating a display of magnified information. A selection is received of an area of a chart to form a selected area, and coordinates are identified for the selected area. A category assigned to the selected area is identified using the coordinates identified. Related areas of the chart are identified using the category identified. The selected area and the related areas are compiled to form display information and the display information is enlarged to fit a display.

Figure 3:
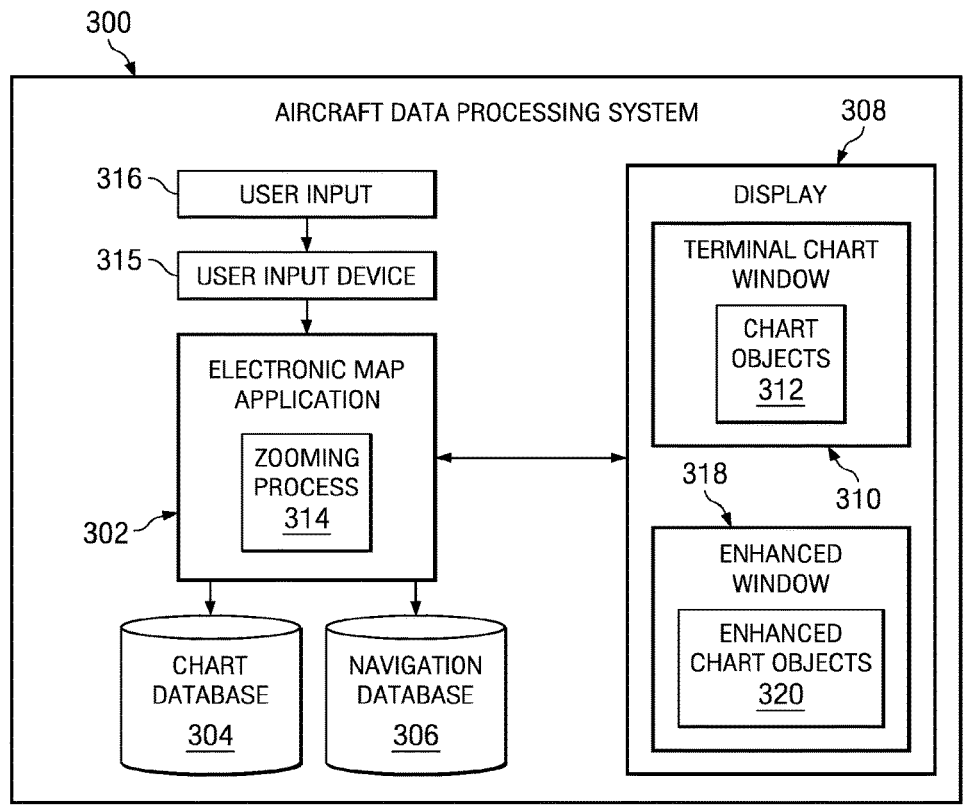
FIG. 3 is a diagram of an apparatus for identifying and enlarging related information in a terminal chart in accordance with an advantageous embodiment.

With reference now to FIG. 3, a diagram of an apparatus for identifying and enlarging related information in a terminal chart is depicted in accordance with an advantageous embodiment. In this example, aircraft data processing system 300 is an example of an aircraft data processing system that may be used in an aircraft, such as aircraft 116 in FIG. 1. Aircraft data processing system 300 may be implemented using one or more of data processing system 200 in FIG. 2. Aircraft data processing system 300 make take various forms.

For example, aircraft data processing system 300 may be a single data processing system or a network data processing system containing multiple computers or line replaceable units. In these advantageous embodiments, aircraft data processing system 300 may be, in another example, an electronic flight bag. An electronic flight bag is an electronic information management device used by flight crews to form management tasks. An electronic flight bag may, for example, provide navigation charts for air and ground operations. An electronic flight bag also might provide a display of various aviation data as well as performing basic calculations, such as performance data and fuel calculations.

Aircraft data processing system 300 includes electronic map application 302, chart database 304, navigation database 306, and display device 308. Display device 308 provides a user interface for an operator to see information and charts presented by electronic map application 302. Display device 308 may be an example of one implementation of display 214 in FIG. 2. Electronic map application 302 may present chart data from chart database 304 and navigation database 306.

Navigation database 306 contains terminal charts containing maps, diagrams, and related textual information used by operators of vehicles, such as pilots operating an aircraft for example. Terminal charts, such as terminal chart 310 for example, include chart objects 312. A chart object is any informational object, or other suitable information that may be within terminal chart 310. For example, chart objects 312 may include, for example, a map, a data box, a data box boundary, and/or any other data provided in terminal chart 310. Chart objects 312 also may include informational objects, such as, for example, very high frequency (VHF) omni-directional radio range (VOR), navigation points, hours of operation, communication frequencies, and other suitable information.

Chart database 304 includes information about chart objects 312, such as object identification data, object location data, object type data, and display configuration data. The information about chart objects 312 in chart database 304 is associated with a specific chart, such as terminal chart 310 found in navigation database 306.

For example, terminal chart 310 is an example of a navigation chart that may be found in navigation database 306. In these illustrative examples, terminal chart 310 is configured for viewing by zooming process 314 using chart database 304, and presented on display device 308. Electronic map application 302 may present terminal chart 310 in a number of different ways. For example, in an advantageous embodiment, terminal chart 310 may be configured for viewing by zooming process 314 to enlarge certain objects within terminal chart 310. Zooming process 314 may identify a category of interest, and enlarge objects related to that category of interest for improved viewing on display device 308. In another advantageous embodiment, terminal chart 310 may be configured for viewing by zooming process 314 to arrange or compile a number of chart objects in a different configuration or order than originally presented in terminal chart 310.

Zooming process 314 within electronic map application 302 identifies selected chart objects and/or a number of related chart objects using chart database 304. A number, as used herein, with reference to an item means one or more items. For example, a number of related chart objects is one or more related chart objects. A related chart object may be one or more chart objects that have been assigned to the same category. For example, in an advantageous embodiment, any chart object with graphical and/or textual information associated with aircraft communications may be assigned to a communications category.

Zooming process 314 may detect the selection of one chart object assigned to the communications category, and identify a number of related chart objects also assigned to the communications category, for example. Zooming process 314 then compiles and enlarges the selected chart object and related chart objects to form enhanced chart objects 320. Zooming process 314 presents enhanced chart objects 320 for viewing in enhanced window 318 on display 308.

In one advantageous embodiment, compiling a number of chart objects may include re-ordering or rearranging the number of chart objects from the initial configuration presented in terminal chart 310 to an enhanced configuration. For example, if one or more of the number of chart objects are located at different non-contiguous locations in the initial configuration presented in terminal chart 310, zooming process 314 may compile each of the number of chart objects into a contiguous format for display in enhanced window 318. A contiguous format refers to an enhanced format where each chart object in the number of chart objects is positioned adjacent to another chart object.

In another illustrative example, each of the number of chart objects may be located adjacent to one another yet in a single row or column. In this initial configuration, the row or column of chart objects may fit within the viewing display. However, if the number of chart objects is selected for enhancement, enlarging the number of chart objects in the initial configuration may result in one or more of the number of chart objects being displayed outside the current display configurations or viewing parameters. In this illustrative example, zooming process 314 may compile the number of chart objects initially presented in a single row or column into a number of rows and/or columns in order to fit each of the number of chart objects in an enlarged format within the display configurations and/or viewing parameters.

Enhanced window 318 may be any type of pop-up window, such as, without limitation, a modal window, a non-modal non-child window, or any other suitable window for viewing on a display device. For example, in one advantageous embodiment, enhanced window 318 may be a modal window. A modal window is a child window which requires the user to interact with it before they can return to operating the parent application. In this illustrative example, the parent application is terminal chart window 310. In another advantageous embodiment, enhanced window 318 may be a non-modal non-child window that could remain visible as long as a user desires.

Enhanced window 318 is initiated by zooming process 314, and in particular by user input 316 activating zooming process 314. Enhanced window 318 may be closed by a number of different methods, including, without limitation, a single mouse click, initiation of a second enhanced window, a command, a time-out, an application-driven event, and/or any other suitable method for closing enhanced window 318. In one illustrative example, a single mouse click on any portion of enhanced window 318 may close enhanced window 318. In another illustrative example, initiation of a second enhanced window may activate a one-window-at-a-time function that closes the first enhanced window.

A command may refer to, without limitation, a standard operating systems command, such as pressing an escape (ESC) key or a close command activated by a user selection of a key or mouse stroke, for example. A time-out may refer to a predetermined amount of time that an enhanced window may remain open. A time-out, may be, for example, expiration of a predetermined amount of time. For example, a predetermined amount of time may be fifteen seconds, and after an enhanced window has been open for fifteen seconds, the enhanced window may automatically close at the expiration of the predetermined amount of time. An application-driven event may be, for example, an avionics box hardware reporting that an aircraft is at the missed approach point in an approach sequence, and dynamically closing a first enhanced window in order to open a second enhanced window related to the missed approach detected.

A selection of an area or category of a chart may be a user-driven selection or an application driven selection. For example, in an advantageous embodiment, a user may select a particular chart object of terminal chart 310 through user input 316 using user input device 315. User input device 315 may be, for example, without limitation, a graphical user interface, a peripheral component of a data processing system such as a keyboard, mouse, or touchscreen, or any other suitable user input device. Zooming process 314 may identify related information provided in chart objects other than the selected chart object, and compile the related chart objects to enlarge all related chart objects for contiguous viewing in display 308.

In another advantageous embodiment, electronic map application may receive user input 316 from a navigation system of an aircraft, such as aircraft 116 in FIG. 1. The user input may indicate that the aircraft has missed a scheduled approach. Zooming process 314 may identify chart objects related to a missed approach and enlarge the identified chart objects for viewing on display 308.

The illustration of different components in aircraft data processing system 300 is not meant to limit the manner in which different advantageous embodiments may be implemented. For example, navigation database 306 and chart database 304 may be integrated in an advantageous embodiment. In another advantageous embodiment, zooming process may be implemented as a separate program or as a plug-in to electronic map application 302. In yet another advantageous embodiment, user input device 315 may be integrated with display device 308.

Figure 4:
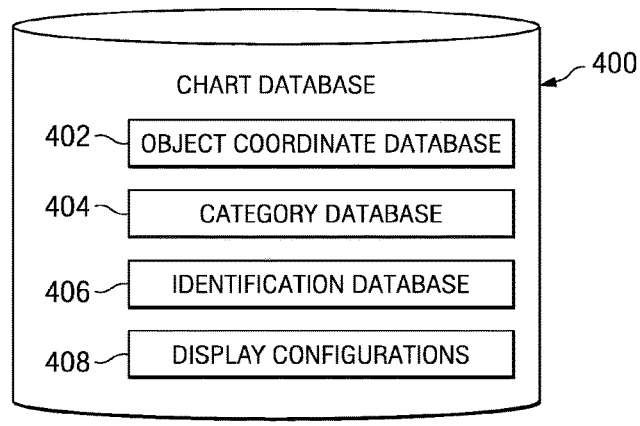
FIG. 4 is a diagram of a chart database in accordance with an illustrative embodiment.

With reference now to FIG. 4, a diagram of a chart database is depicted in accordance with an illustrative embodiment. Chart database 400 is an example of one implementation of chart database 304 in FIG. 3.

Chart database 400 includes object coordinate database 402, category database 404, identification database 406, and display configurations 408. As used herein, objects in a chart may be an example of one implementation of chart objects 312 in terminal chart 310 in FIG. 3.

Object coordinate database 402 contains the object boundary coordinates for each object in a chart, such as terminal chart 310 in FIG. 3. In an advantageous embodiment, each object in a chart is specified by x/y coordinates for the boundaries, or corners, of the object, such as a box for example. The object boundary coordinates may uniquely identify each object in a chart.

In these illustrative, examples, category database 404 contains categorical assignments for each object identified by object boundary coordinates in a chart, such as terminal chart 310 in FIG. 3, based on the contextual information or textual data contained within the object. For example, in an advantageous embodiment, each object in a chart may be uniquely identified by the corresponding boundary coordinates for the object and assigned a category based on the context of the information provided within the object.

In this example, any object with graphical and/or textual information related to a missed approach for an aircraft may be assigned to a category for missed approach. In another example, any object with graphical and/or textual information related to communications may be assigned to a category for communications.

Optionally, identification database 406 may contain a unique identifier, other than object boundary coordinates, associated with each object in a number of objects in a chart, such as terminal chart 310 in FIG. 3. The unique identifier may be, for example, without limitation, a numerical identifier, an alpha-numeric identifier, a symbol, a token, and/or any other unique identifier that identifies a specific object from among all objects. In some advantageous embodiments, a single object, such as a single box in a chart, may have more than one unique identifier, each of which identifies it for a different purpose.

Display configurations 408 contains information about the display parameters associated with a number of different display devices, such as display 308 in FIG. 3, used by an electronic map application, such as electronic map application 302 in FIG. 3. Display parameters may include, without limitation, at least one of the size of a display screen, the resolution, the aspect ratio, the dot pitch, the contrast ratio, and/or any other suitable display parameter. As used herein, at least one refers to one or more display parameters. Display configurations 408 also contains information about grouping a number of objects into a display configuration that fits the particular display device, such as display 308 in FIG. 3. For example, in an advantageous embodiment, if a display screen has an aspect ratio of 4:3 and a screen size of twenty-one inches, display configurations 408 may indicate that the number of objects may be grouped adjacent to each other in three rows and three columns to form a grid of objects and enlarged to a certain degree. If the display screen has an aspect ratio of 16:9 and a screen size of twenty-one inches, display configurations 408 may indicate that the number of objects may be grouped adjacent to each other in two rows and five columns to form a grid of objects and enlarged to a certain degree, for example. Display configurations may also include width and height information for the terminal chart window, such as terminal chart window 310 in FIG. 3.

In another illustrative example, if a number of non-contiguous objects in a chart are selected for display, display configurations 408 may provide the parameters for re-ordering the number of non-contiguous objects into a contiguous display. This display is one that fits the display device when each object selected is also enlarged or magnified.

The illustration of chart database 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, chart database 400 may contain different and/or additional databases of information. In some advantageous embodiments, identification database 406 may be unnecessary and object coordinate database 402 may provide sufficient identification for individual objects in a chart. In yet other advantageous embodiments, chart database 400 may include databases separate from display configurations 306 for information on ordering non-contiguous information into a contiguous display format.

Figure 5:
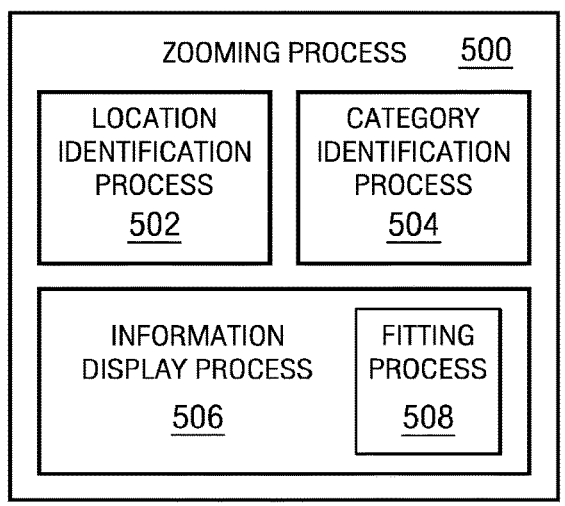
FIG. 5 is a diagram of a zooming process in accordance with an illustrative embodiment.

With reference now to FIG. 5, a diagram of a zooming process is depicted in accordance with an illustrative embodiment. Zooming process 500 is an example of one implementation of zooming process 314 in FIG. 3.

Zooming process 500 includes location identification process 502, category identification process 504, and information display process 506. Location identification process 502 identifies the area of the chart, such as terminal chart 310 in FIG. 3, where a selection of a chart object has been made. This selection may be, for example, a user selection by mouse click of a box within a chart for example. The area of the chart may be identified by using a object coordinate database of x/y coordinates for objects in a chart, such as object coordinate database 402 in chart database 400 in FIG. 4, in order to determine the unique identifier for the object selected by user input.

In an illustrative example, where an object is a box, a minimum of two x/y coordinates for two different corners of a box may be needed for location identification process 502 to identify the location of the selected box within the chart.

After location identification process 502 has identified the selected object, type identification process 504 identifies the category for the selected object using a database, such as category database 404 in FIG. 4. Information display process 506 receives the category identified by category identification process 504, and determines if there are related objects assigned to the same category.

Information display process 506 may access category database 404 in FIG. 4 in order to gather a number of related objects, such as multiple boxes assigned to the same category. Information display process 506 also compiles and enlarges the number of related objects using information from display configurations 408 in FIG. 4 to present enhanced chart objects, such as enhanced chart objects 320 in FIG. 3, of a chart, such as terminal chart 310 in FIG. 3.

Information display process 506 may include fitting process 508. Fitting process 508 may take into account the number of the related objects and the size of each object to be displayed in the enhanced window. Fitting process 508 may use the number and size information for each of the related objects, along with the display configurations for the display device, to arrange the enlarged objects to create a new enhanced window that is easy to view. The display configurations for the display device may include width and height information for the terminal chart window, such as terminal chart window 310 in FIG. 3.

The illustration of zooming process 500 in FIG. 5 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments. For example, in some advantageous embodiments, zooming process 500 may contain different and/or additional processes.

Figure 6:
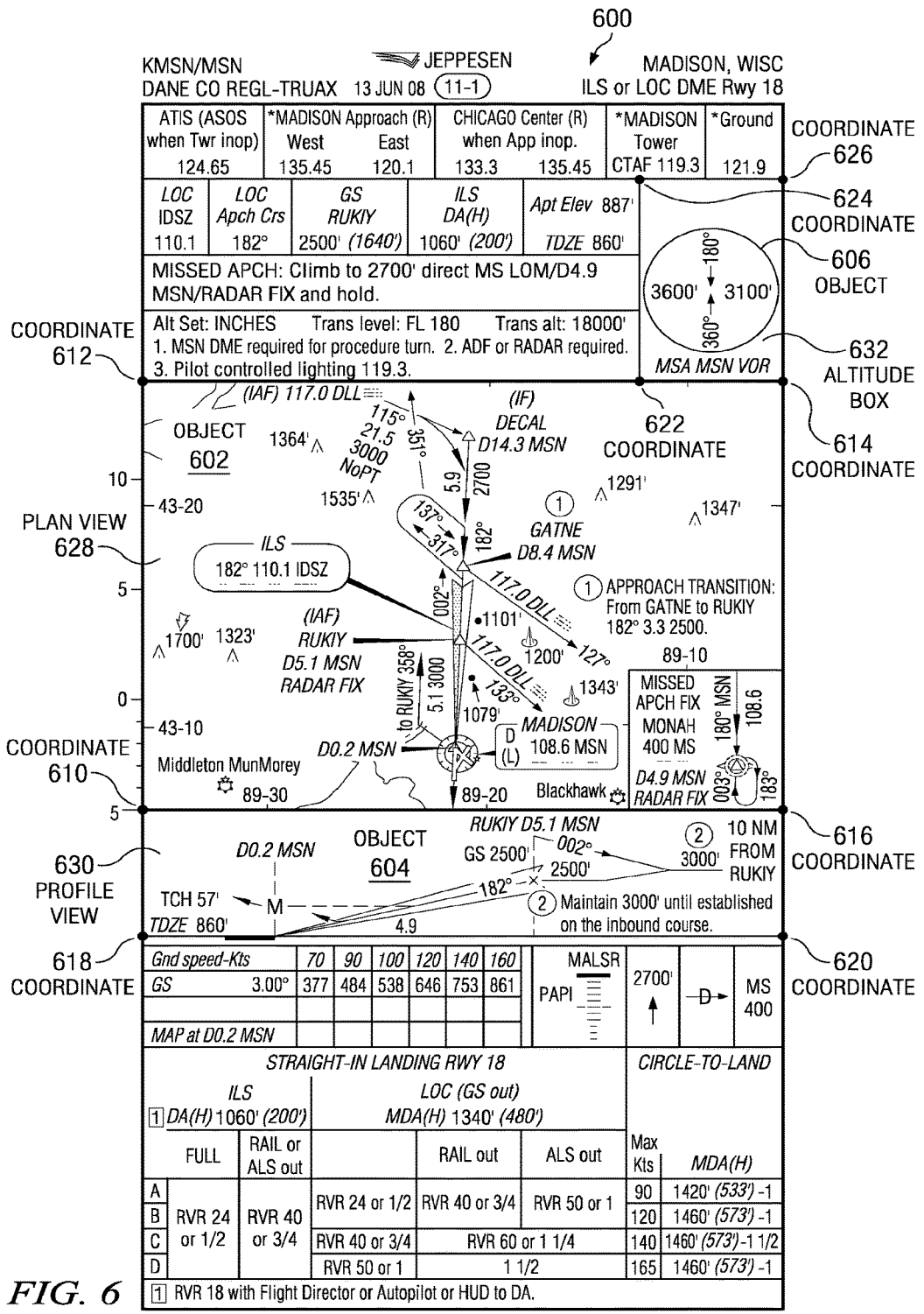
FIG. 6 is a diagram of a terminal chart in accordance with an illustrative embodiment.

With reference now to FIG. 6, a diagram of a terminal chart is depicted in accordance with an illustrative embodiment. Terminal chart 600 is an example of one implementation of terminal chart 310 implemented by electronic map application 302 in FIG. 3. Terminal chart 600 may be displayed on display 308 in FIG. 3.

Terminal chart 600 includes a number of chart objects. Among the number of chart objects for terminal chart 600 are object 602, object 604, and object 606. Objects 602, 604, and 606 are examples of one implementation of chart objects 312 in FIG. 3. Terminal chart 600 is presented for display at a size that presents difficulty for a user to decipher the graphical and textual information provided within the chart objects, such as object 602, object 604, and object 606.

Terminal chart 600 also includes a number of x/y coordinates for each of objects 602, 604, and 606. Coordinates 610, 612, 614, 616, 618, 620, 622, 624, and 626 are examples of x/y coordinates stored in object coordinate database 402 in FIG. 4 that uniquely identify chart objects, such as objects 602, 604, and 606. Object 602 has coordinate 610, coordinate 612, coordinate 614, and coordinate 616 as boundary definitions for object 602. Object 604 has coordinate 610, coordinate 616, coordinate 618, and coordinate 620 as boundary definitions for object 604. Object 606 has coordinate 622, coordinate 624, coordinate 626, and coordinate 614 as boundary definitions for object 606.

Terminal chart 600 also includes a number of categories for each of objects 602, 604, and 606. Object 602 is assigned to a category for plan view 628. Object 604 is assigned to a category for profile view 630. Object 606 is assigned to a category for altitude box 632. Plan view 628, profile view 630, and altitude box 632 are illustrative examples of object category assignments stored in category database 404 in FIG. 4.

Figure 7:
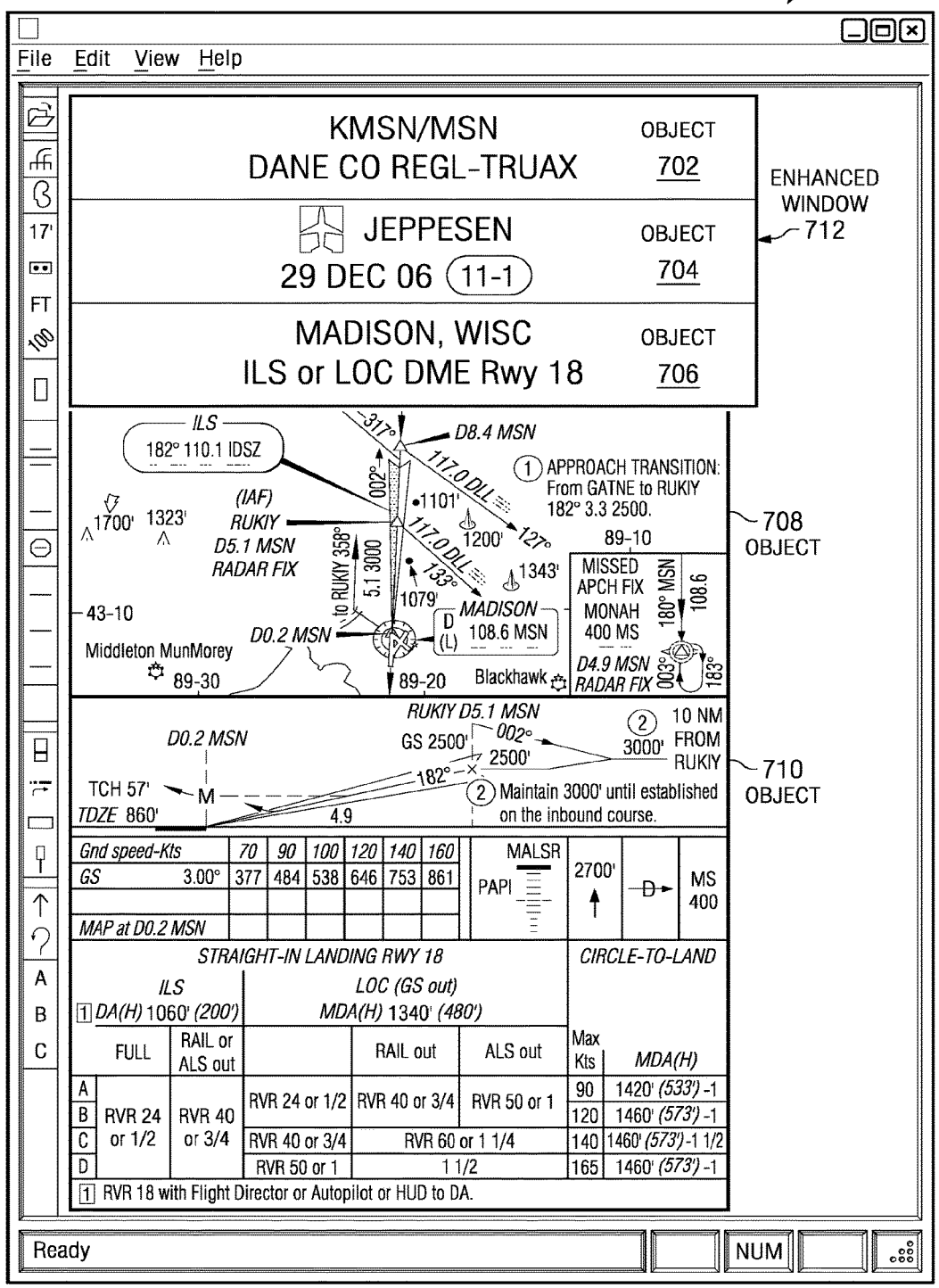
FIG. 7 is a diagram of a terminal chart in accordance with an illustrative embodiment.

With reference now to FIG. 7, a diagram of a terminal chart is depicted in accordance with an illustrative embodiment. Terminal chart 700 is an example of one implementation of terminal chart 310 implemented by zooming process 314 in FIG. 3.

Terminal chart 700 includes a number of chart objects. Among the number of chart objects for terminal chart 700 are object 702, object 704, object 706, object 708, and object 710. Objects 702, 704, and 706 are examples of one implementation of enhanced chart objects 320 in FIG. 3. Objects 702, 704, and 706 have been enlarged and compiled in a contiguous format by a process, such as zooming process 314 in FIG. 3, for presentation in enhanced window 712. This presentation may be on a display, such as display 308 in FIG. 3. Enhanced window 712 is an example of one implementation of enhanced window 318 in FIG. 3. In this illustrative example, objects 702, 704, and 706 represent examples of chart objects assigned to a header portion category, and contain textual and graphical information associated with header information for a terminal chart.

Figure 8:
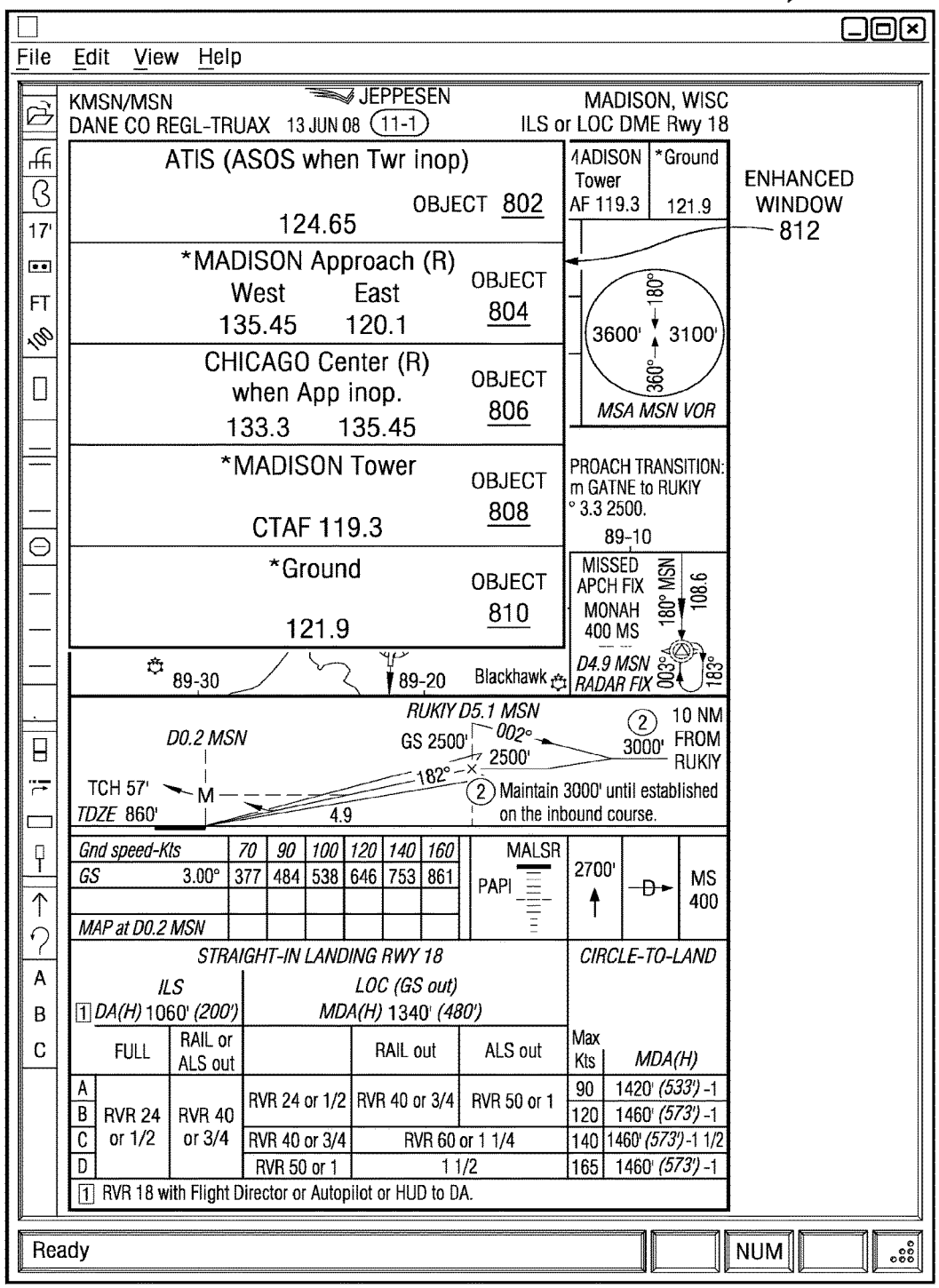
FIG. 8 is a diagram of a terminal chart in accordance with an illustrative embodiment.

With reference now to FIG. 8, a diagram of a terminal chart is depicted in accordance with an illustrative embodiment. Terminal chart 800 is an example of one implementation of terminal chart 310 implemented by zooming process 314 in FIG. 3.

Terminal chart 800 includes a number of chart objects. Among the number of chart objects for terminal chart 800 are object 802, object 804, object 806, object 808, and object 810. Objects 802, 804, 806, 808, and 810 are examples of one implementation of enhanced chart objects 320 in FIG. 3. Objects 802, 804, 806, 808, and 810 have been enlarged and compiled in a contiguous format by a process, such as zooming process 314 in FIG. 3, for presentation in enhanced window 812. This presentation may be on a display, such as display 308 in FIG. 3. Enhanced window 812 is an example of one implementation of enhanced window 318 in FIG. 3. In this illustrative example, objects 802, 804, 806, 808, and 810 represent examples of chart objects assigned to a communications frequency category, and contain textual and graphical information associated with communications frequency for a terminal chart.

In an advantageous embodiment, user input selecting object 802 may be received, and a process, such as location identification process 502 in FIG. 5, may identify the coordinates for object 802. A process, such as category identification process 504 in FIG. 5, may then identify the category assignment for object 802. A process, such as information display process 506 in FIG. 5, may identify objects 804, 806, 808, and 810 as related objects. The information display process may then compile and enlarge objects 802, 804, 806, 808, and 810 into a contiguous format for viewing in enhanced window 812.

Figure 9:
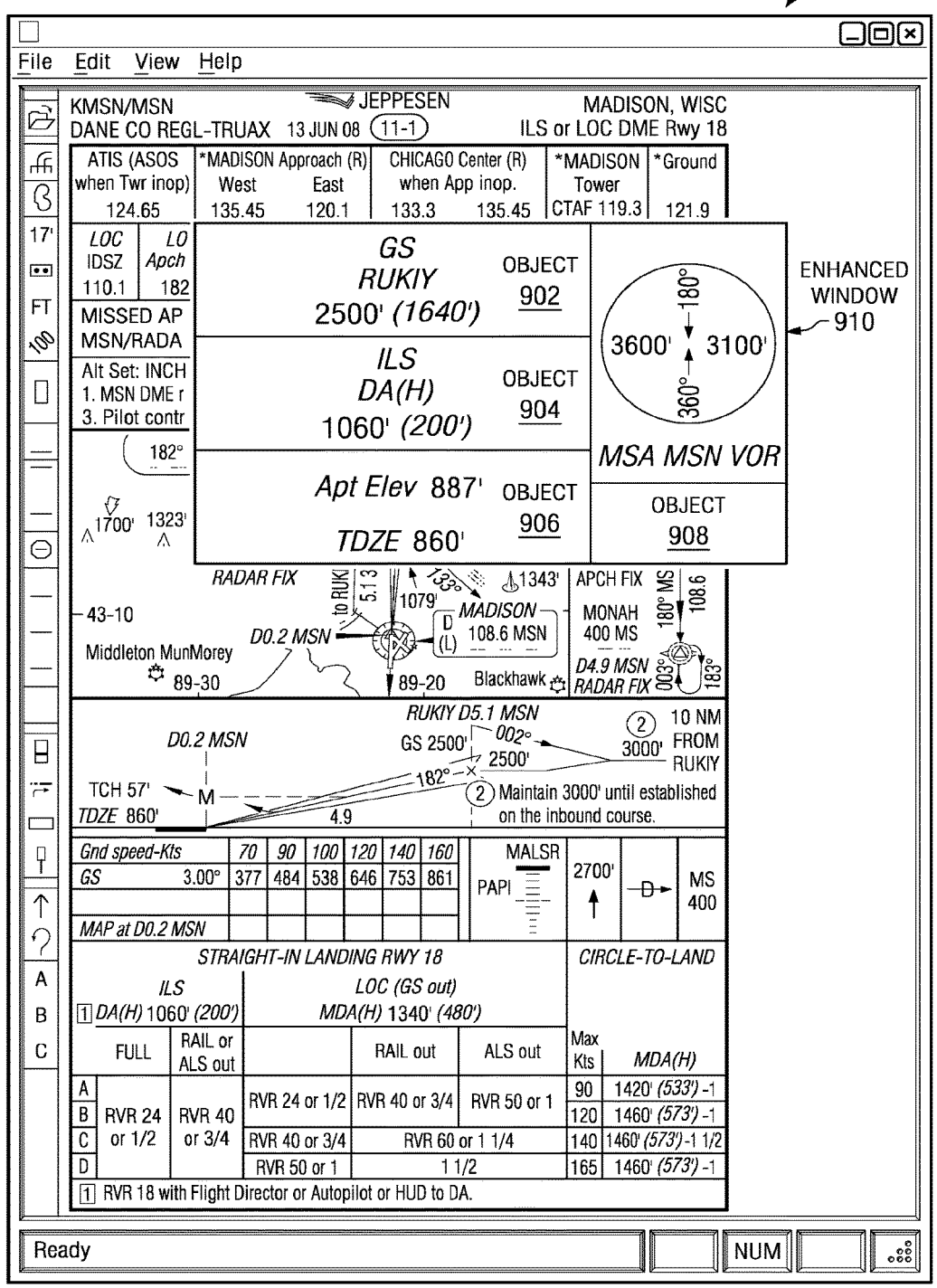
FIG. 9 is a diagram of a terminal chart in accordance with an illustrative embodiment.

With reference now to FIG. 9, a diagram of a terminal chart is depicted in accordance with an illustrative embodiment. Terminal chart 900 is an example of one implementation of terminal chart 310 implemented by zooming process 314 in FIG. 3.

Terminal chart 900 includes a number of chart objects. Among the number of chart objects for terminal chart 900 are object 902, object 904, object 906, and object 908. Objects 902, 904, 906, and 908 are examples of one implementation of enhanced chart objects 320 in FIG. 3. Objects 902, 904, 906, and 908 have been enlarged and compiled in a contiguous format by a process, such as zooming process 314 in FIG. 3, for presentation in enhanced window 910. This presentation may be on a display, such as display 308 in FIG. 3. Enhanced window 910 is an example of one implementation of enhanced window 318 in FIG. 3. In this illustrative example, objects 902, 904, 906, and 908 represent examples of chart objects assigned to an altitude category, and contain textual and graphical information associated with altitude for a terminal chart.

In an advantageous embodiment, user input selecting object 908 may be received, and a process, such as location identification process 502 in FIG. 5, may identify the coordinates for object 908. A process, such as category identification process 504 in FIG. 5, may then identify the category assignment for object 908, and information display process 506 in FIG. 5 may identify objects 902, 904, and 906 as related objects. The information display process may then compile and enlarge objects 902, 904, 906, and 908 into a contiguous format for viewing in enhanced window 910.

Figure 10:
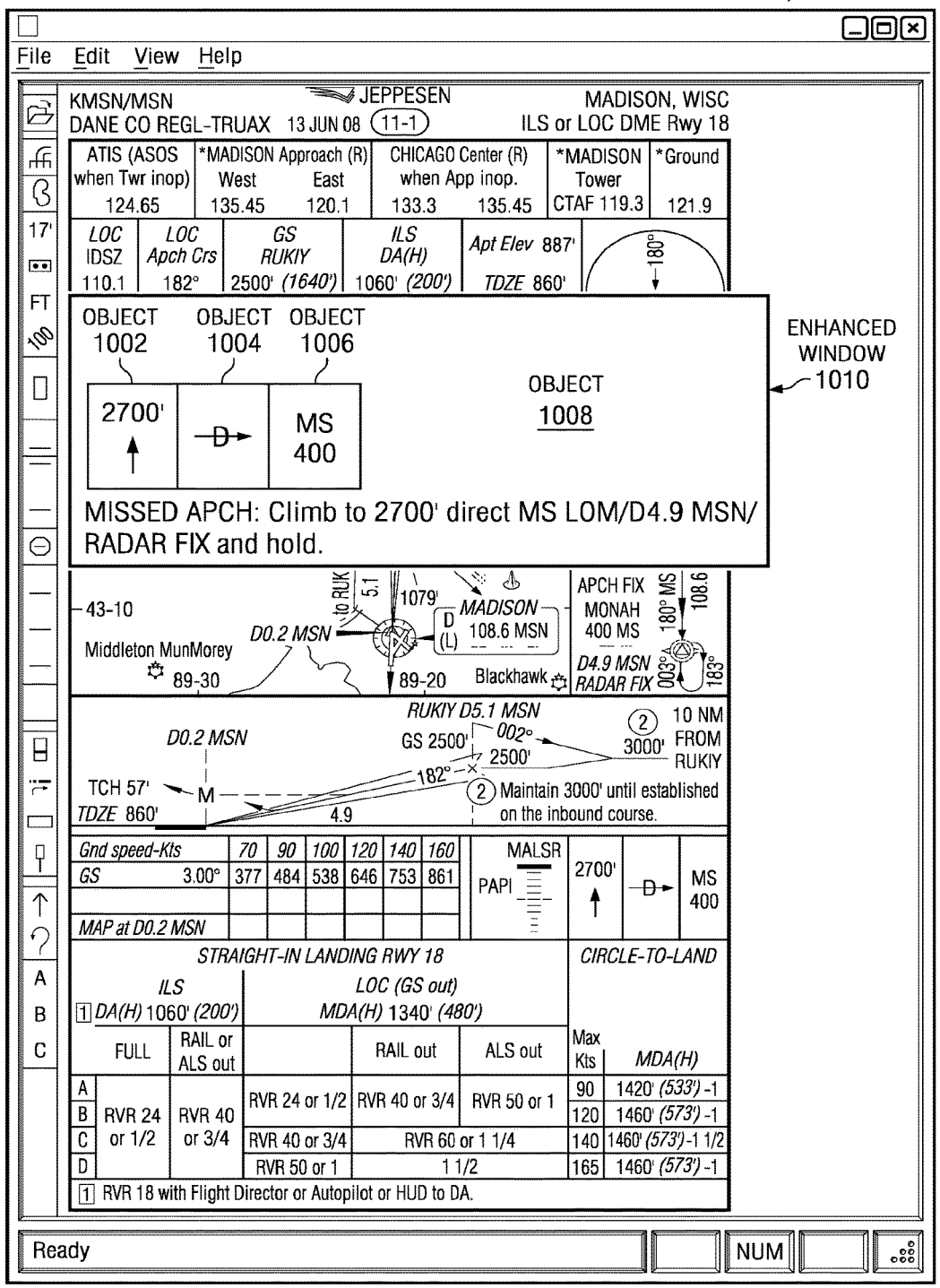
FIG. 10 is a diagram of a terminal chart in accordance with an illustrative embodiment.

With reference now to FIG. 10, a diagram of a terminal chart is depicted in accordance with an illustrative embodiment. Terminal chart 1000 is an example of one implementation of terminal chart 310 implemented by zooming process 314 in FIG. 3.

Terminal chart 1000 includes a number of chart objects. Among the number of chart objects for terminal chart 1000 are object 1002, object 1004, object 1006, and object 1008. Objects 1002, 1004, 1006, and 1008 are examples of one implementation of enhanced chart objects 320 in FIG. 3. Objects 1002, 1004, 1006, and 1008 have been enlarged and compiled in a contiguous format by a process, such as zooming process 314 in FIG. 3, for presentation in enhanced window 1010. The presentation may be on a display, such as display 308 in FIG. 3. Enhanced window 1010 is an example of one implementation of enhanced window 318 in FIG. 3. In this illustrative example, objects 1002, 1004, 1006, and 1008 represent examples of chart objects assigned to an altitude category, and contain textual and graphical information associated with altitude for a terminal chart.

In an advantageous embodiment, user input identifying object 1008 may be received, such as an application-driven input recognizing a missed approach. A process, such as location identification process 502 in FIG. 5, may identify the coordinates for object 1008. A process, such as category identification process 504 in FIG. 5, may then identify the category assignment for object 1008. A process, such as information display process 506 in FIG. 5, may identify objects 1002, 1004, and 1006 as related objects. Information display process 506 may then compile and enlarge objects 1002, 1004, 1006, and 1008 into a contiguous format for viewing in enhanced window 1010.

In an advantageous embodiment, an application-driven input, or application-driven event, may occur when an electronic map application having a display device is connected to a navigation device, such as a global positioning system or flight management system for example. The navigation device may notify the electronic map application that a certain event has occurred. An event may be, for example, without limitation, the passing of a waypoint, arrival at a location, or a phase of a flight, such as a missed approach, for example. These events may be used to trigger the display of certain chart areas, such as the navigation frequencies or chart objects assigned to the category of navigation. These events may also be used to trigger the closing of a previously displayed enhanced window.

Figure 11:
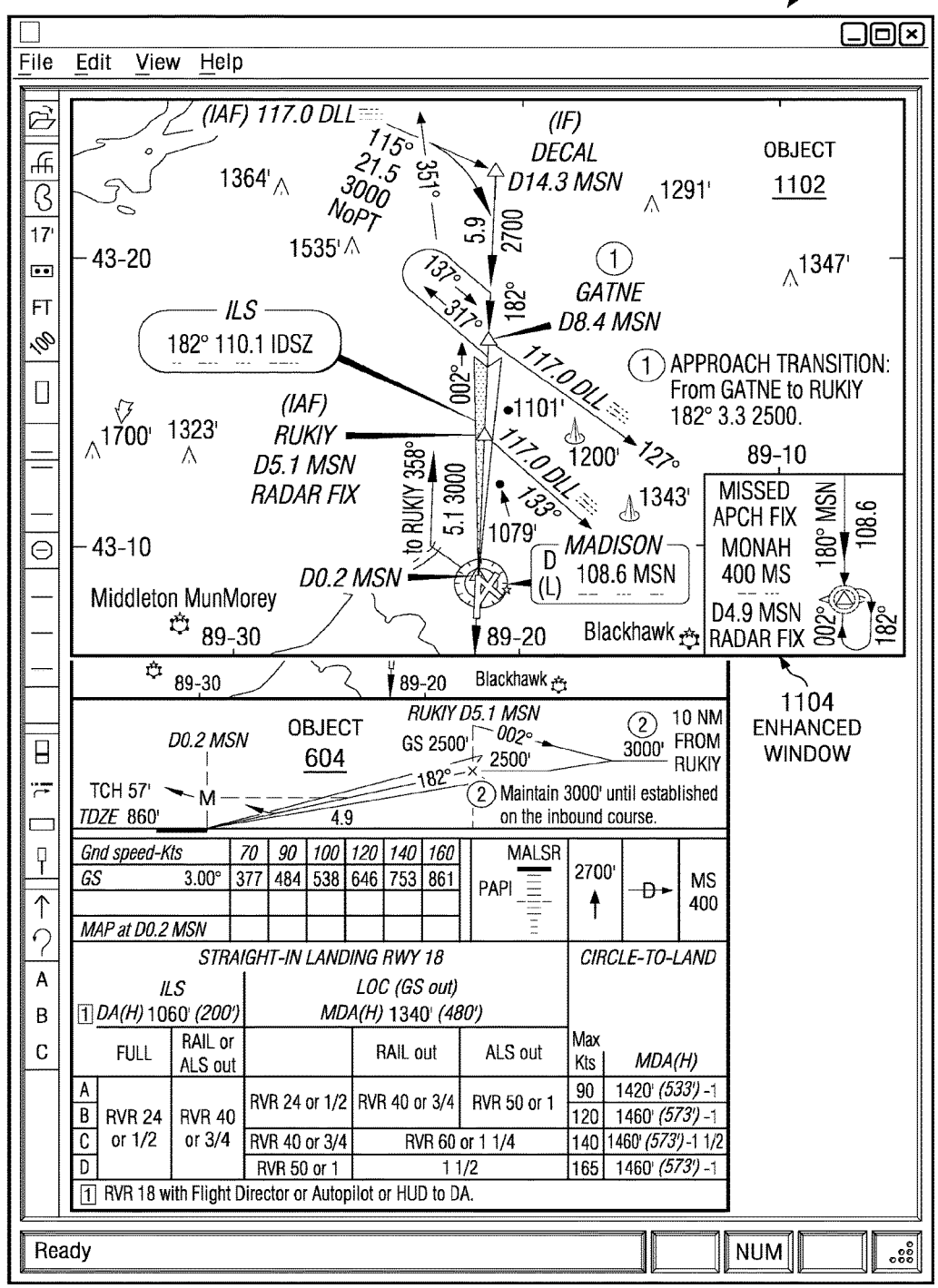
FIG. 11 is a diagram of a terminal chart in accordance with an illustrative embodiment.

With reference now to FIG. 11, a diagram of a terminal chart is depicted in accordance with an illustrative embodiment. Terminal chart 1100 is an example of one implementation of terminal chart 310 implemented by zooming process 314 in FIG. 3.

Terminal chart 1100 includes object 1102 presented within enhanced window 1104. In this illustrative example, object 1102 represents an example of an object assigned to a plan view category, and contains textual and graphical information associated with a plan view for a terminal chart.

Figure 12:
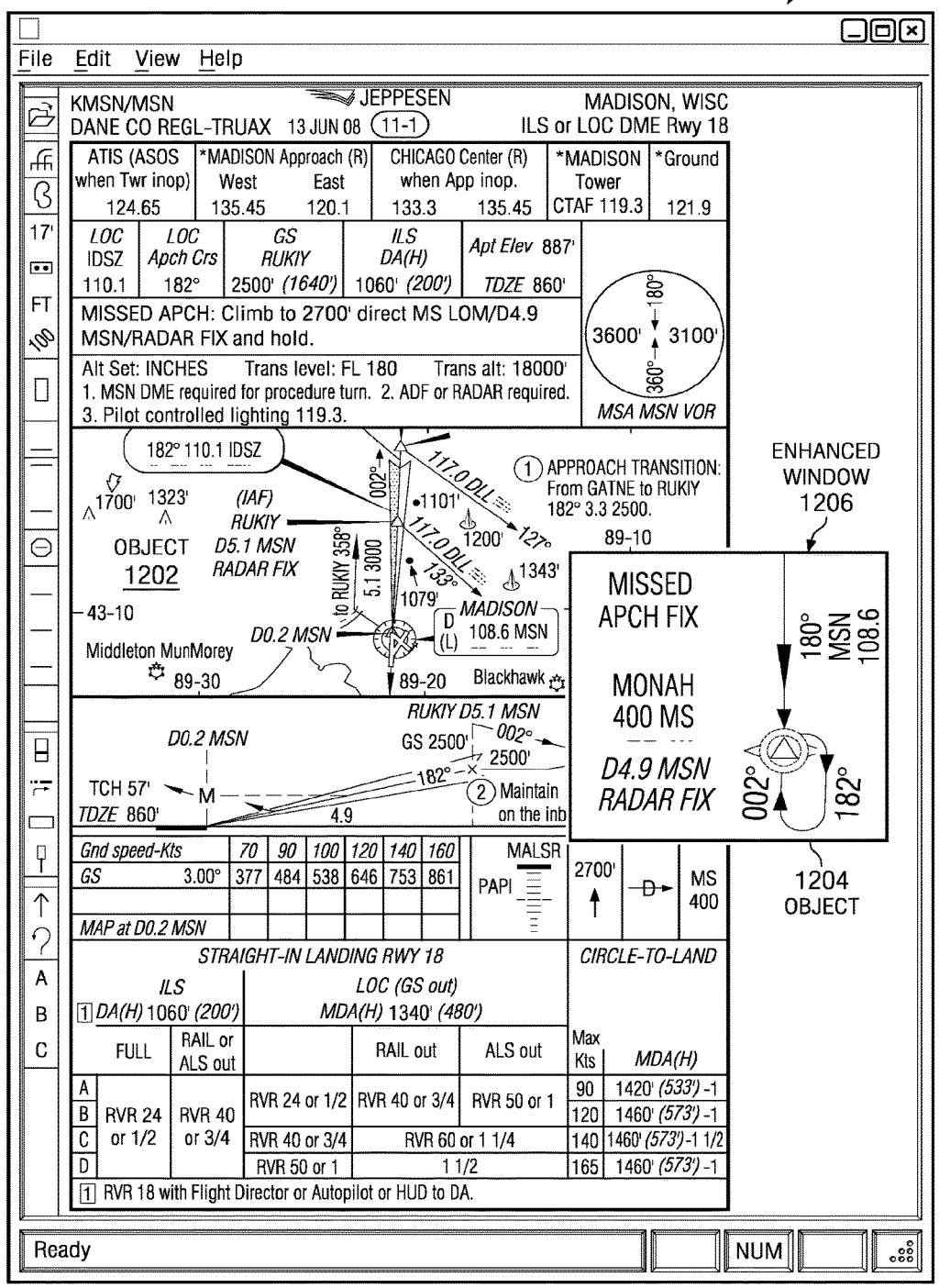
FIG. 12 is a diagram of a terminal chart in accordance with an illustrative embodiment.

With reference now to FIG. 12, a diagram of a terminal chart is depicted in accordance with an illustrative embodiment. Terminal chart 1200 is an example of one implementation of terminal chart 310 implemented by zooming process 314 in FIG. 3.

Terminal chart 1200 includes object 1202 and object 1204. Object 1202 is an example of one implementation of chart objects 312 in FIG. 3. Object 1204 is an example of one implementation of enhanced chart objects 320 in FIG. 3. Enhanced window 1206 is an example of one implementation of enhanced window 318 in FIG. 3 presented by a process, such as zooming process 314 in FIG. 3. This presentation may be on a display, such as display 308 in FIG. 3. In this illustrative example, object 1202 represents an example of an object assigned to a plan view category, and object 1204 represents a chart inset for object 1202.

Figure 13:
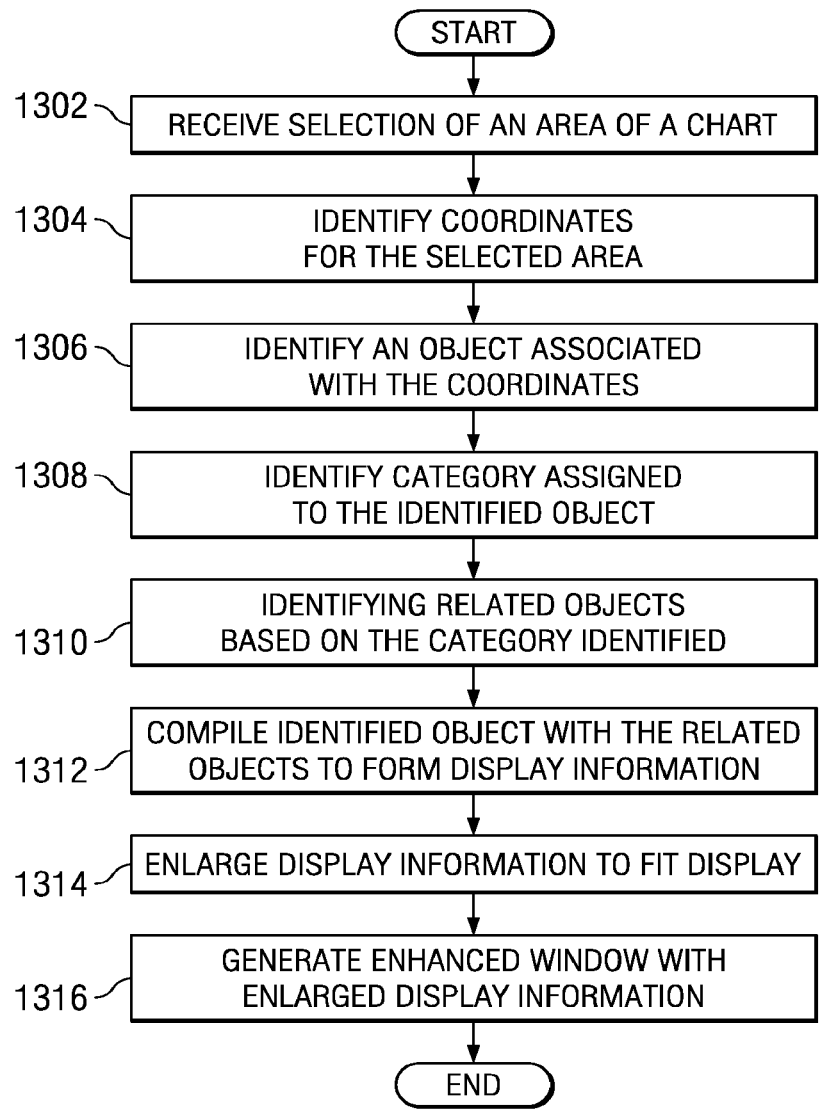
FIG. 13 is a flowchart illustrating a process for displaying enlarged related information in accordance with an illustrative embodiment.

With reference now to FIG. 13, a flowchart illustrating a process for displaying enlarged related information is depicted in accordance with an illustrative embodiment. The process in FIG. 13 may be implemented by a process, such as zooming process 314 in FIG. 3.

The process begins by receiving a selection of an area of a chart via a user interface (operation 1302). The selection may be made, for example, by user input clicking on an area of interest within the chart. The process identifies coordinates for the selected area (operation 1304). The coordinates may be x/y coordinates for a box boundary, such as coordinates 610, 612, 614, and 616 for object 602 in FIG. 6 for example, stored in a database, such as object coordinate database 402 in FIG. 4.

The process then identifies an object associated with the coordinates (operation 1306). The process may identify the object associated with the coordinates using a database, such as object coordinate database 402 in FIG. 4, for example. Next the process identifies a category assigned to the identified object (operation 1308). The category assignment may be, for example, a category such as plan view 628 in FIG. 6, stored in a database, such as category database 404 in FIG. 4. The process then identifies related objects based on the category identified (operation 1310). Next, the process compiles the identified object with the related objects to form display information (operation 1312). In operation 1312, the process compiles information from the identified object and the related objects by manipulating the information in a manner suitable for display. For example, if the user selection is for a box within a chart with a category assignment of communications, the process identifies other boxes with the same category assignment of communications. The process may then arrange the related boxes into a contiguous format regardless of the original location of an individual box within the chart. A contiguous format refers to an enhanced format where each related box is positioned adjacent to another related box in the enhanced format. In another illustrative example, if the category identified is altitude box, such as altitude box 632 in FIG. 6, the process may identify other chart objects with the same category assignment. The process may then arrange all of the chart objects with the same category assignment in a contiguous format for enhanced viewing on a display. As used herein, data refers to a number of objects and/or boxes within a chart. As used herein, a number refers to one or more objects and/or boxes.

The process then enlarges the display information to fit the display (operation 1314). This display may be, for example, a display such as display 308 in FIG. 3. The process generates an enhanced window with the enlarged display information (operation 1316), with the process terminating thereafter. This enhanced window may be, for example, a window such as enhanced window 318 in FIG. 3.

The process may use a database, such as display configurations 408 in FIG. 4, to determine the current display configurations for the display device being used. The related objects are the number of chart objects identified as having the same category assignment as the chart object in the selected area. For example, if the chart object in the selected area is identified as an altitude box, the number of related objects identified will be a number of chart objects each having the same category assignment of an altitude box. The enlarged display information will be arranged in a contiguous format regardless of the original location for each individual chart object on the chart.

Figure 14:
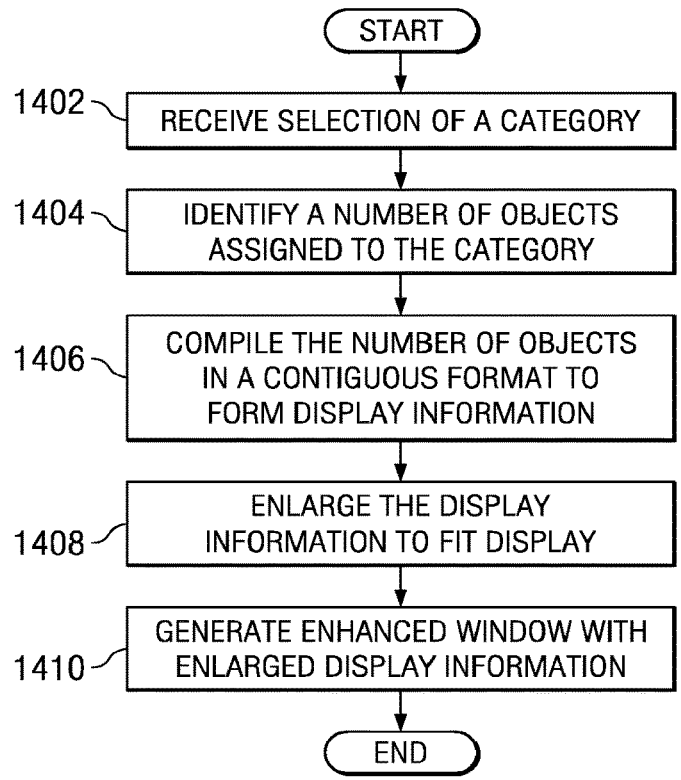
FIG. 14 is a flowchart illustrating a process for application driven display of enlarged related information in accordance with an illustrative embodiment.

With reference now to FIG. 14, a flowchart illustrating a process for application driven display of enlarged related information is depicted in accordance with an illustrative embodiment. The process in FIG. 14 may be implemented by a zooming process, such as zooming process 314 in FIG. 3.

The process begins by receiving a selection of a category (operation 1402). In an illustrative example, the selection of a category may be user input selecting a specific category. User input may refer to input by a human user or an application, such as a navigation system of an aircraft for example. The category may be a category assignment, such as plan view 628 in FIG. 6, stored in a database, such as category database 404 in FIG. 4.

Next, the process identifies a number of objects assigned to the category (operation 1404). For example, if the category selected is altitude box, such as altitude box 632 in FIG. 6, the process may identify other chart objects with the same category assignment. As used herein, a number refers to one or more objects.

The process compiles the number of objects identified in a contiguous format to form display information (operation 1406). The process then enlarges the display information to fit the display (operation 1408). The process generates an enhanced window with the enlarged display information (operation 1410), with the process terminating thereafter.

The process may use a database, such as display configurations 408 in FIG. 4, to determine the current display configurations for the display device being used. The enlarged display information will be arranged in a contiguous format regardless of the original location for each individual object on the chart.

Figure 15:
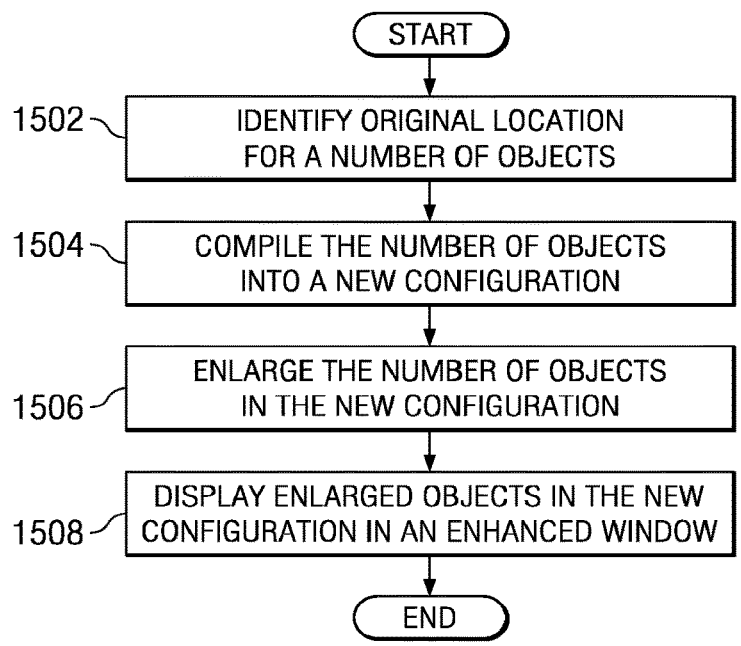
FIG. 15 is a flowchart illustrating a process for enhancing a number of chart objects in accordance with an illustrative embodiment.

With reference now to FIG. 15, a flowchart illustrating a process for enhancing a number of chart objects is depicted in accordance with an illustrative embodiment. The process in FIG. 15 may be implemented by a zooming process, such as zooming process 314 in FIG. 3.

The process begins by identifying an original location for a number of objects (operation 1502). The number of objects may be chart objects, such as chart objects 312 in FIG. 3. The number of objects may be identified and/or related objects identified using a category selection or a chart area selection, for example. The original location may refer to the initial location of each object in the number of objects on a terminal chart, such as terminal chart 310 in FIG. 3, for example.

Next, the process compiles the number of objects into a new configuration (operation 1504) using display configuration information, such as display configurations 408 in FIG. 4. In one advantageous embodiment, compiling a number of objects may include re-ordering or rearranging the number of objects from the initial configuration presented in a terminal chart, such as terminal chart 310 for example, to an enhanced configuration, or new configuration. For example, if one or more of the number of objects are located at different non-contiguous locations in the initial configuration presented in a terminal chart, a process, such as zooming process 314 in FIG. 3 for example, may compile each of the number of objects into a contiguous format for display in an enhanced window. A contiguous format refers to an enhanced format where each object in the number of objects is positioned adjacent to another object.

In another illustrative example, each of the number of objects may be located adjacent to one another yet in a single row or column. In this initial configuration, the row or column of objects may fit within the viewing display. However, if the number of objects is selected for enhancement, enlarging the number of objects within the initial configuration may result in one or more of the number of objects being displayed outside the current display configurations or viewing parameters. In this illustrative example, a process, such as zooming process 314 in FIG. 3, may compile the number of objects initially presented in a single row or column into a number of rows and/or columns in order to fit each of the number of objects in an enlarged format within the display configurations and/or viewing parameters. The process may use display configuration information to determine the new configuration.

Display configurations information may contain information about grouping a number of objects into a display configuration that fits the particular display device, such as display 308 in FIG. 3. For example, in an advantageous embodiment, if a display screen has an aspect ratio of 4:3 and a screen size of twenty-one inches, the display configurations information may indicate that the number of objects may be grouped adjacent to each other in three rows and three columns to form a grid of objects and enlarged to a certain degree. If the display screen has an aspect ratio of 16:9 and a screen size of twenty-one inches, the display configurations information may indicate that the number of objects may be grouped adjacent to each other in two rows and five columns to form a grid of objects and enlarged to a certain degree, for example. Display configurations may also include width and height information for the terminal chart window, such as terminal chart window 310 in FIG. 3.

The process then enlarges the number of objects in the new configuration (operation 1506) using display parameters found in display configuration information, such as display configurations 408 in FIG. 4. Display parameters may include, without limitation, at least one of the size of a display screen, the resolution, the aspect ratio, the dot pitch, the contrast ratio, and/or any other suitable display parameter. As used herein, at least one refers to one or more display parameters. In another illustrative example, if a number of non-contiguous objects in a chart are selected for display, display configurations 408 may provide the parameters for re-ordering the number of non-contiguous objects into a contiguous display. This display is one that fits the display device when each object selected is also enlarged or magnified.

The process then displays the enlarged objects in the new configuration in an enhanced window (operation 1508), such as enhanced window 318 in FIG. 3, with the process terminating thereafter.

An enhanced window may be any type of pop-up window, such as, without limitation, a modal window, a non-modal non-child window, or any other suitable window for viewing on a display device.

In an illustrative example, a process, such as zooming process 314 in FIG. 3, may identify the original location of each chart object assigned to the communications category in the initial configuration of a terminal chart. The process may compile the chart objects into a new configuration that places each chart object into a contiguous format and enlarge the chart objects to form display information, such as enhanced chart objects 320 in FIG. 3. The process may then display the enlarged chart objects in their new configuration for viewing in an enhanced window, such as enhanced window 318 on display 308 in FIG. 3.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Therefore, the different advantageous embodiments provide a computer implemented method, apparatus, and computer program product for generating a display of magnified information. A selection is received of an area of a chart on a display device to form a selected area through a user input device. Coordinates are identified for the selected area. A category assigned to the selected area is identified using the coordinates identified. Related areas of the chart are identified using the category identified. The selected area and the related areas are compiled to form display information and the display information is displayed on the display device having a selected size.

The different advantageous embodiments provide for context sensitive zooming and viewing of related areas of a chart. A user may identify and view areas of interest within a chart with less user interaction simply by selecting the area of interest. The area of interest and any related areas are enhanced in a separate enlarged popup window for easy viewing. The different advantageous embodiments allow for faster operations and more efficient viewing of important information during operation of an aircraft, for example.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Although the different advantageous embodiments have been described with respect to aircraft. The different advantageous embodiments may be used with other types of platforms. For example, the different advantageous embodiments may be implemented in a flight control tower, a car, a bus, a submarine, a surface ship, a spacecraft, and/or in some other suitable platform. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for generating a display of magnified information, the method comprising:
    receiving a selection of an area of a chart on a display device to form a selected area through a user input device;
    responsive to receiving the selection, identifying coordinates for the selected area using a processor unit;
    identifying an object associated with the coordinates for the selected area to form an identified object;
    identifying a category assigned to the identified object using the coordinates identified by the processor unit;
    identifying related objects within the chart using the category identified by the processor unit;
    compiling the identified object and the related objects to form display information using the processor unit; and
    displaying the display information on the display device.

2. The method of claim 1, further comprising:
    enlarging the display information to fit a size of the display device.

3. The method of claim 1, wherein displaying the display information on the display device further comprises:
    generating a new window for the display information; and displaying the new window over the chart on the display device.

4. The method of claim 1, wherein compiling the identified object and the related objects to form display information further comprises:
identifying an original location for a number of objects.

5. The method of claim 4, further comprising:
compiling the number of objects into a new configuration, wherein the new configuration includes at least one new location for at least one object in the number of objects.

6. The method of claim 5, further comprising:
enlarging the number of objects in the new configuration to form enlarged objects in the new configuration; and
displaying the enlarged objects in the new configuration in an enhanced window.

7. The method of claim 6, wherein the enhanced window is selected from at least one of a pop-up window, a modal window, and a non-modal non-child window.

8. A method for generating a display of magnified information presented in a terminal chart composed of a plurality of objects representing data in the terminal chart, wherein each object of the plurality of objects is uniquely identified by corresponding boundary coordinates for corresponding ones of the plurality of objects, wherein a corresponding category is assigned to corresponding ones of the plurality of objects based on a corresponding context of corresponding information provided within the corresponding ones of the plurality of objects, whereby a plurality of categories is associated with ones of the plurality of objects of the terminal chart, the method comprising:
receiving, at a processor unit, a selection of an area of the terminal chart on a user input device to form a selected area through the user input device;
responsive to receiving the selection, identifying by the processor unit coordinates of the terminal chart for the selected area;
identifying, by the processor unit, an object associated with the coordinates to form an identified object;
identifying, by the processor unit, a category, from the plurality of categories, assigned to the identified object;
identifying, by the processor unit, related objects within the terminal chart using the category identified by the processor unit;
compiling, by the processor unit, the identified object and the related objects to form display information; and
displaying the display information on a display device.

9. The method of claim 8, wherein the display device is also a user input device.

10. The method of claim 9, further comprising:
enlarging the display information to fit a size of the display device.

11. The method of claim 8, wherein displaying the display information on the display device further comprises:
generating a new window for the display information.

12. The method of claim 11 further wherein displaying the display information on the display device further comprises:
displaying the new window over the chart on the display device.

13. The method of claim 8, wherein compiling the identified object and the related objects to form display information further comprises:
identifying an original location for a number of objects.

14. The method of claim 13, further comprising:
compiling the number of objects into a new configuration, wherein the new configuration includes at least one new location for at least one object in the number of objects.

15. The method of claim 14, further comprising:
enlarging the number of objects in the new configuration to form enlarged objects in the new configuration.

16. The method of claim 15 further comprising:
displaying the enlarged objects in the new configuration in an enhanced window in the display device.

17. The method of claim 16, wherein the enhanced window is selected from at least one of a pop-up window, a modal window, and a non-modal non-child window.

18. A computer comprising:
a processor unit; and
a memory connected to the processor unit, the memory storing computer usable program code which, when executed by the processor, performs a computer-implemented method for generating a display of magnified information presented in a terminal chart composed of a plurality of objects representing data in the terminal chart, wherein each object of the plurality of objects is uniquely identified by corresponding boundary coordinates for corresponding ones of the plurality of objects, wherein a corresponding category is assigned to corresponding ones of the plurality of objects based on a corresponding context of corresponding information provided within the corresponding ones of the plurality of objects, whereby a plurality of categories is associated with ones of the plurality of objects of the terminal chart, the computer usable program code comprising:
first computer usable program code for receiving, at a processor unit, a selection of an area of the terminal chart on a user input device to form a selected area through the user input device;
second computer usable program code for, responsive to receiving the selection, identifying by the processor unit coordinates of the terminal chart for the selected area;
third computer usable program code for identifying, by the processor unit, an object associated with the coordinates to form an identified object;
fourth computer usable program code for identifying by the processor unit, a category, from the plurality of categories, assigned to the identified object;
fifth computer usable program code for identifying, by the processor unit, related objects within the terminal chart using the category identified by the processor unit;
sixth computer usable program code for compiling, by the processor unit, the identified object and the related objects to form display information; and
seventh computer usable program code for displaying the display information on a display device.

19. The computer of claim 18, wherein the computer usable program code further comprises:
eighth computer usable program code for enlarging the display information to fit a size of the display device.

20. The computer usable program code of claim 19, wherein the computer usable program code for displaying the display information on the display device further comprises:
ninth computer usable program code for generating a new window for the display information; and
tenth computer usable program code for displaying the new window over the chart on the display device.

* * * * *